United States Patent [19]

Privat

[11] Patent Number: 4,601,181
[45] Date of Patent: Jul. 22, 1986

[54] INSTALLATION FOR CLEANING CLOTHES AND REMOVAL OF PARTICULATE CONTAMINANTS ESPECIALLY FROM CLOTHING CONTAMINATED BY RADIOACTIVE PARTICLES

[76] Inventor: Michel Privat, 6, rue Monsigny, 75002 Paris, France

[21] Appl. No.: 552,971

[22] Filed: Nov. 17, 1983

[30] Foreign Application Priority Data

Nov. 19, 1982 [FR] France .............................. 82 19457

[51] Int. Cl.⁴ ............................................ D06F 43/08
[52] U.S. Cl. ..................... 68/18 C; 68/18 F; 159/DIG. 12; 202/83; 202/170; 210/167
[58] Field of Search ................. 68/18 R, 18 C, 18 F, 68/13 R, 210; 8/142; 202/170, 170 D, 83; 134/12, 109; 159/DIG. 12; 210/167

[56] References Cited

U.S. PATENT DOCUMENTS

| | | | |
|---|---|---|---|
| 1,027,563 | 5/1912 | Priest | 202/83 X |
| 2,053,103 | 9/1936 | Passar | 68/18 R |
| 2,357,869 | 9/1944 | Beckwith | 202/83 X |
| 2,404,722 | 10/1968 | Bloore . | |
| 3,011,956 | 12/1961 | Smith et al. | 68/18 C X |
| 3,391,550 | 7/1968 | Williams | 68/18 C X |
| 3,426,555 | 2/1969 | McCutcheon, Jr. | 68/18 C X |
| 3,692,467 | 9/1972 | Durr et al. | 68/18 C X |
| 3,974,528 | 8/1976 | Claunch et al. | 210/167 |
| 3,992,300 | 11/1976 | Hill | 210/167 |
| 4,111,034 | 9/1978 | Hubner | 68/18 R X |

FOREIGN PATENT DOCUMENTS

| | | |
|---|---|---|
| 1614497 | 8/1970 | Fed. Rep. of Germany . |
| 516003 | 12/1920 | France .............................. 202/170 |
| 1470582 | 1/1967 | France . |
| 2035303 | 12/1970 | France . |
| 2116646 | 7/1972 | France . |
| 2174760 | 10/1973 | France . |
| 2477757 | 9/1981 | France . |
| 1802806 | 10/1975 | United Kingdom . |

*Primary Examiner*—Philip R. Coe
*Attorney, Agent, or Firm*—Burgess, Ryan & Wayne

[57] ABSTRACT

In an installation comprising a solvent regeneration circuit and a solvent recovery circuit, each solvent container is connected independently to the boiler of a distillation unit for cleaning purposes. The relative arrangement of the solvent containers is such that the solvent circulates under the action of gravity from a condenser to the boiler and from each container to the boiler. The boiler is removable for subsequent disposal after filling with solvent residues and waste materials.

10 Claims, 7 Drawing Figures

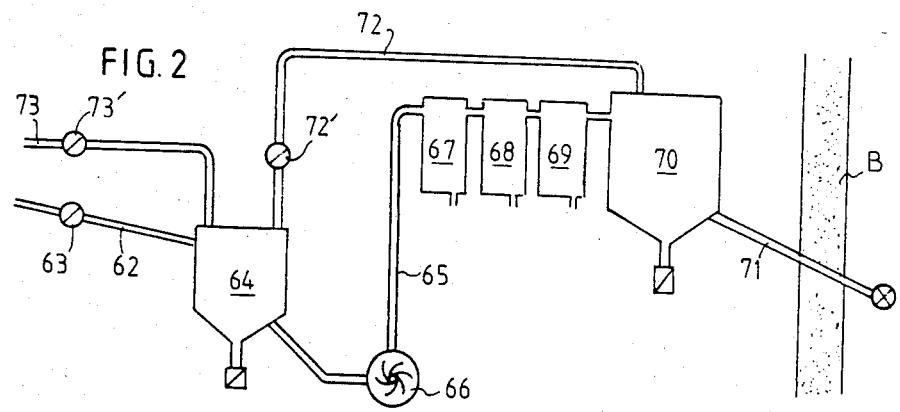
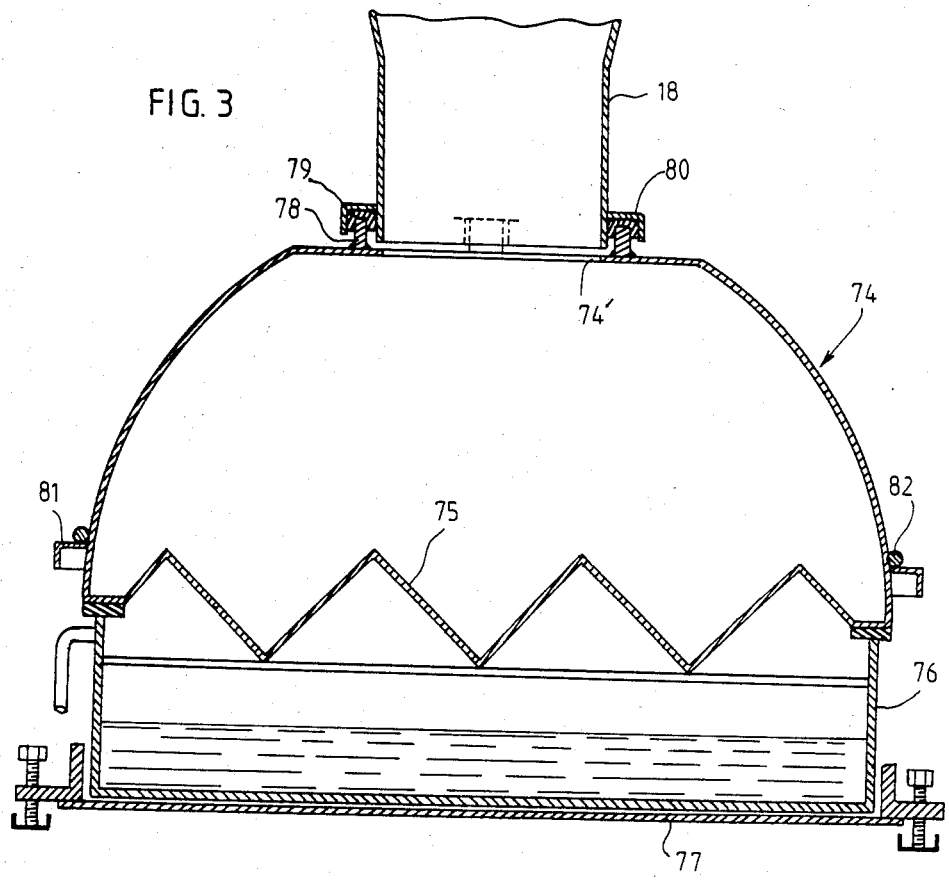

INSTALLATION FOR CLEANING CLOTHES AND REMOVAL OF PARTICULATE CONTAMINANTS ESPECIALLY FROM CLOTHING CONTAMINATED BY RADIOACTIVE PARTICLES

This invention relates to an installation for cleaning and removal of particulate contaminants from clothing and is primarily applicable to clothing contaminated by radioactive particles.

In an ever-increasing number of industrial and research activities such as electronics, precision engineering, optics, the pharmaceutical industry, the hospital field, and so on, it is necessary at the present time to ensure that working clothes are provided without any trace of detachable particles or fibers which could be released into work areas known as "clean" or "ultraclean" rooms.

Moreover, in regard to activities in the nuclear industry, clothing removed after service is liable to be contaminated by hazardous radioactive particles and therefore calls for decontamination.

In some instances, articles of clothing require to be subjected to removal of particulate contaminants prior to use in the work area as well as after use in cases of work performed in a radioactive atmosphere.

At the present time, methods and installations for cleaning and decontamination of clothing which produce the best results are those which make use of dry-cleaning solvents. The advantage of these solvents lies in the fact that they can be regenerated. In a single operation, they accordingly permit both cleaning (namely removal of dirt normally deposited on any article of clothing which has been worn) and decontamination which, in general terms, consists of more extensive cleaning in order to remove detachable particles and fibers.

The solvents which achieve the most satisfactory results at the present time are monofluorotrichloromethane designated as type R 11 and especially trichlorotrifluoroethane designated as type R 113.

Generally speaking, two types of installations are in current use and comprise a wash-drum machine into which the clothes are introduced. These installations operate either at atmospheric pressure or in a vacuum.

However, all of these installations are attended by disadvantages which it has not thus far been possible to overcome satisfactorily, especially in regard to the following points:

these installations make use of circuits which are sometimes complex with a large number of components which cannot be perfectly maintained and especially cleaned, particularly in the case of installations designed for operation in a vacuum, the reliability of which is in any case uncertain;

a satisfactory standard of fluid-tightness and containment of the various elements and piping which form the solvent circulation systems is not achieved, thus presenting not-negligible hazards from the point of view nuclear decontamination;

thus far, no installation has been proposed in which the contaminated portions are correctly separated from the clean portions and connected respectively to contaminated areas or enclosures separated from clean areas or enclosures; such a precaution is nevertheless essential, especially in applications involving nuclear decontamination;

the installations are such that a considerable number of locations are liable to retain contaminated particles or waste material, thus making it very difficult if not actually impossible to ensure correct cleaning of the installation, thereby giving rise to potential hazards in the field of nuclear decontamination.

It is consequently an object of the invention to provide an installation for cleaning and removal of particulate contaminants from clothing, which overcomes the drawbacks recalled in the foregoing.

It is a primary object of the invention to provide an installation which operate on a very simple principle and permit very easy maintenance and cleaning of the different parts of the installation.

It is another object of the invention to provide an installation for cleaning and removal of particulate contaminants from clothing which permit a considerable reduction in the number of constituent elements of the solvent circulation system, thus removing any risks of deficient fluid-tightness and/or any risks of retention of contaminated waste material at a large number of locations.

It is a further object of the invention to provide an installation for cleaning and decontamination of clothing which makes it possible to concentrate contaminated wastes at a single location.

It is still another object of the invention to provide an installation such that all of its "contaminated" parts can readily be separated from its "clean" parts.

It is again another object of the invention to provide an installation for cleaning and decontamination of clothing which are capable of delivering articles of clothing having a quality of cleanness which meet the most stringent requirements of current standards, especially the American ASTM standard, or even a higher quality of cleanness.

In the method according to the invention, of the type involving a dry-cleaning solvent medium and operation at atmospheric pressure, the solvent is circulated in a closed circuit and is purified by distillation between the outlet and the inlet of the cleaning tank, the drying air being also circulated in a closed circuit and separated from the solvent between the tank inlet and the tank outlet. The method essentially consists in cleaning each solvent container of either of the two fluid circuits whenever the need arises by draining said container directly at the distillation station and by filling said container with distilled solvent.

The contaminated wastes obtained during several cleaning and decontamination cycles are collected at one and the same point before being removed. Moreover, the circulation of solvent outside the distillation station takes place solely under the action of gravity.

Furthermore, the invention proposes to subject the distilled solvent to a filtration process outside any clothing-cleaning cycle prior to introduction of said solvent into the tank for a cleaning operation.

The installation according to the invention comprises a wash-drum tank which is interposed on the one hand in a solvent regeneration circuit of the type consisting of a distillation unit, a condenser, a water separator, a solvent storage tank and which is interposed on the other hand in a solvent recovery circuit of the condenser type for recovering the solvent entrained by the drying air. The distinctive feature of the installation lies in the fact that each solvent container is connected independently and directly with interposition of valves to the boiler of the distillation unit for independent cleaning purposes.

The solvent recovery circuit advantageously comprises a cooler bank for condensation of the solvent vapors, the solvent recovery unit being connected upstream of the water separator of the solvent regeneration circuit.

The installation further comprises, in the solvent regeneration circuit, a water recovery tank which is placed downstream of the water separator and is directly connected to the boiler.

In accordance with another distinctive feature of the present invention, the boiler is removably mounted on the distillation column.

In an advantageous embodiment, the boiler comprises a tank for collecting spent solvents and contaminated wastes, the tank being independent of the heating means which can consist of a water-bath tank.

If the spent solvents and wastes do not constitute an excessive degree of contamination, the same boiler can be used again after suitable cleaning. On the other hand, if the level of contamination is too high, the arrangements made in accordance with the invention consist in collecting all contaminated wastes in the boiler and then disposing of the boiler.

In accordance with the invention, the installation can be completed by a filtration device comprising a plurality of cartridge filters of decreasing porosity interposed between the distilled solvent reservoir and the cleaning and decontamination tank. In the case under consideration, the cartridge filters may advantageously consist of borosilicate fibers.

Moreover, and in accordance with the invention, the elements of the solvent regeneration and recovery circuits are assembled together in a single module which is intended to remain in a contaminated storage room. The wash tank together with its various incoming and outgoing pipes constitutes a second module having two openings, only the clothing-discharge opening being intended to communicate with the clean room.

Other features of the invention will be more apparent upon consideration of the following description and accompanying drawings, wherein:

FIG. 2 is a schematic view of a filtration device which can optionally be integrated with the installation;

FIG. 3 is a transverse sectional view of a boiler;

The installation in accordance with the invention for cleaning and removal of particulate contamination of clothing is primarily intended for nuclear decontamination.

Figure 1:
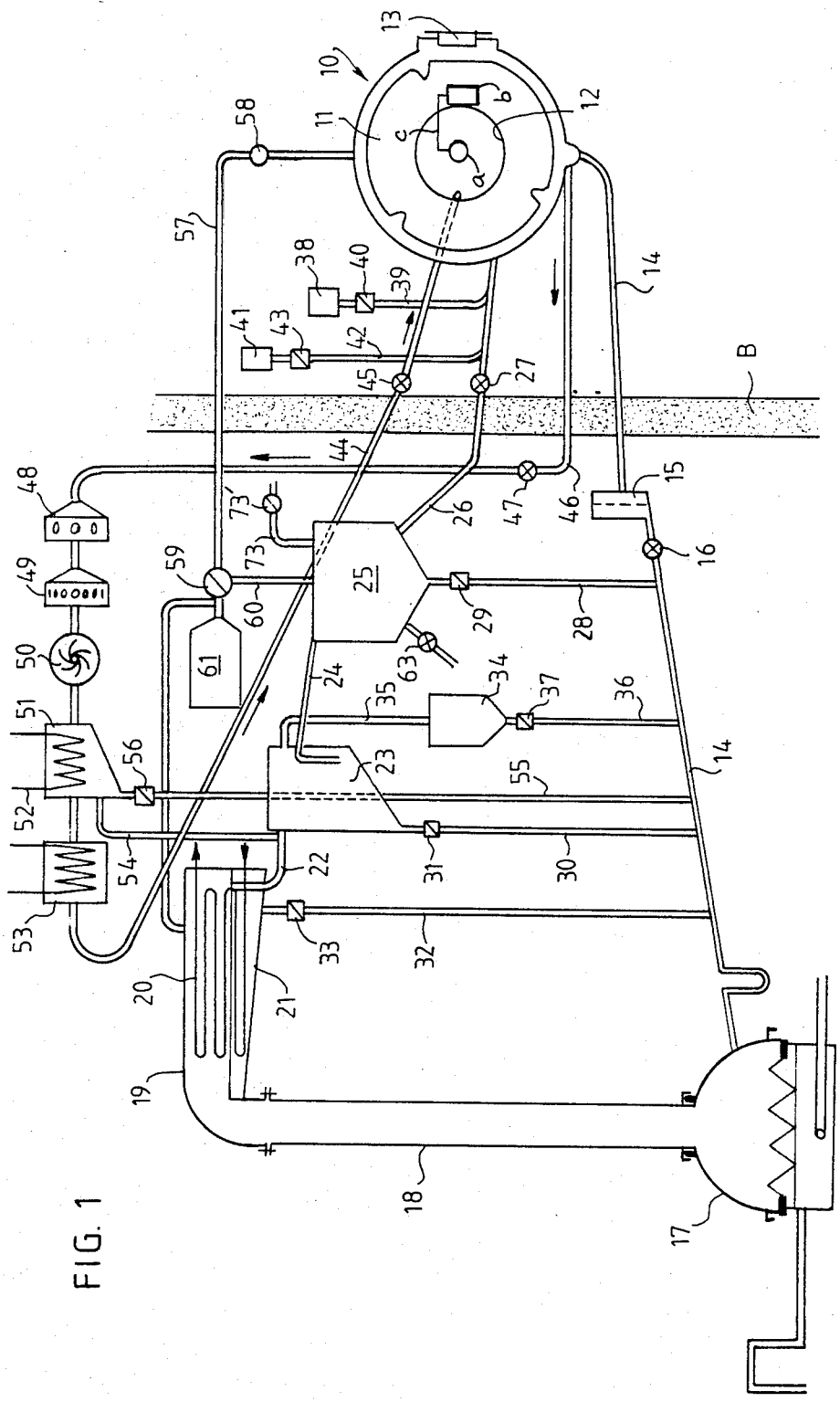
FIG. 1 is a schematic view of an installation in accordance with the invention.

As shown in FIG. 1, the installation comprises a tank 10 which is equipped with an internal drum 11 and into which articles of clothing are introduced. Said tank has two openings, namely a front-wall opening 12 and a side-wall opening 13, these two openings being separate and distinct from each other. One opening is restricted to the introduction of soiled and contaminated clothing whereas the other opening is restricted to the discharge of clean and decontaminated clothing. FIG. 1 shows a radiation-measuring means comprised of a sensor a on the inner side of a door covering opening 12 and which is connected with locking means b associated with the door through a connection c, shown schematically for automatically initiating the locking of the cleaning tank in the event of unsatisfactory decontamination.

A pipe 14, which opens at one end into the bottom of the tank and in which are interposed a wide-mesh filter 15 or a "button filter" for retaining large-size solid particles as well as a tank drain-off valve 16, opens at the other end into the boiler 17 of a distillation apparatus. Said boiler will be described in detail hereinafter.

The distillation apparatus further comprises a column 18, the upper end of which is connected to a condenser 19 equipped with a cooler bank 20 in the form of a snaked pipe coil in which is circulated a coolant consisting, for example, of water.

The lower portion of the condenser 19 is so designed as to form a tank 21 for solvent storage and settling with respect to the water particles which may be contained in the solvent. Said tank 21 is connected via an overflow pipe 22 to a gravity-type water separator 23. By means of a pipe 24, the lower end of which opens into the lower portion of the separator 23, said separator is connected to a reservoir 25 for freshly distilled solvent. By means of a pipe 26 in which is interposed a solvent admission valve 27, said reservoir 25 is connected to the tank 10 for cleaning and decontamination of clothing.

In accordance with an important feature of the invention, each solvent container of the solvent regeneration circuit which has just been described is connected independently and directly to the boiler 17. Thus the washdrum tank 10 is connected to the boiler by means of the pipe 14 as already mentioned. The solvent reservoir 25 is connected to the boiler by means of a pipe 28 in which is mounted a hand-operated drain-off valve 29. The water separator 23 is connected to the boiler by means of a pipe 30 in which is mounted a hand-operated drain-off valve 31. And the distillation condenser 19 is connected to the boiler by means of a pipe 32 in which another hand-operated drain-off valve 33 is mounted.

The solvent regeneration circuit further comprises a reservoir 34 for storage of the water after separation of this latter within the separator 23 to which said reservoir is connected by means of a pipe 35. The water storage reservoir 34 is in turn connected independently via a pipe 36 in which is mounted a hand-operated drain-off valve 37 to the pipe 14 which opens directly into the boiler 17.

It is worthy of note that, in accordance with customary practice, the solvent circuit which has just been described also comprises adjuvant reservoirs such as for example, a cleaning adjuvant reservoir 38 as well as a rinsing adjuvant reservoir 41 which are adapted to communicate respectively via a pipe 39 and a pipe 42 with the pipe 26 which serves to feed the freshly distilled solvent into the tank 10, said pipes 39 and 42 being equipped respectively with a metering valve 40 and 43.

In accordance with another important feature of the invention, the different units of the solvent regeneration circuit, namely the condenser 19, the separator 23, the water storage reservoir 34, the distilled solvent reservoir 25, the wash-drum tank 10 and the boiler, are so arranged with respect to each other that, in the first place, the solvent flows under the action of gravity from the condenser to the tank and from this latter to the boiler and that, similarly, the different solvent containers communicate with the boiler under the action of gravity. The bottom walls of the different solvent containers are advantageously frusto-conical or pyramidal in order to facilitate gravity flow, provision being made for solvent circulation pipes of sufficiently large diameter for the same purpose.

The installation further comprises a circuit for recovery of the solvent which is entrained by the drying air.

This circuit comprises a pipe 44 which serves to supply air to the wash-drum tank and in which is mounted an air intake valve 45, and an air return or recirculating pipe 46 in which is mounted an air-recirculating valve 47. Said valve 47 is followed successively by a so-called "lint" prefilter 48, a dust and particle filter 49, an air-circulating fan or blower 50, a solvent separating and recovery unit 51 comprising a cooler bank consisting of a pipe coil 52 in which is circulated a coolant fluid and finally an air reheater bank 53.

The solvent recovery unit 51 is connected via a pipe 54 to the pipe 22 for feeding solvent into the water separator 23. Said solvent recovery unit is also connected independently to the boiler by means of a pipe 55 in which is interposed a hand-operated drain-off valve 56. Said pipe 55 opens directly into the pipe 14 which leads to the boiler 17.

The installation in accordance with the invention operates under atmospheric pressure and further comprises a pressure-equalizing system which includes a pipe 57 connected on the one hand to the top internal volume of the tank 10 with interposition of a valve 58 for isolating the tank and for pressure equalization. Said pipe 57 is connected on the other hand either to the reservoir 25 via a three-way valve 59 and a pipe 60 or to an expansion tank 61.

In fact, pressure-equalizing pipes serve to interconnect the internal volumes of each container which is intended to be filled with solvent.

In accordance with an optional arrangement which is contemplated by the invention and which may be found desirable in order to achieve a particularly high degree of decontamination, the installation can be equipped with a filtration device in which the distilled solvent is circulated prior to introduction into the tank 10. The advantage of filtration of the solvent after distillation of this latter and not during its cleaning cycle lies essentially in the enhanced performance of the filtration elements thus achieved, both in regard to quality of filtration and in regard to length of service life of the elements.

Said filtration device as illustrated in FIG. 2 comprises a solvent reservoir 64 which performs the function of a buffer tank and is connected to the reservoir 25 by means of a pipe 62 equipped with a valve 63. Said solvent reservoir is also connected via a pipe 65 fitted with a circulating pump 66 to a plurality of filter cartridges 67, 68, 69 arranged in series and in a successively decreasing order of porosity such as, for example, $2\mu$, $0.9\mu$ and $0.3\mu$. The last filter cartridge 69 is connected to a filtered distilled solvent reservoir 70 which is connected by means of a pipe 71 to the solvent inlet of the tank 10. Provision is also made in this case for pressure-equalizing pipes such as, for example, a pipe 72 fitted with a valve 72' between the reservoirs 70 and 64 and a pipe 73 in which is mounted a valve 73' between the reservoirs 64 and 25.

The cartridge filters 67, 68, 69 are advantageously of borosilicate microfibers and may thus be vitrified when they are contaminated by nuclear wastes.

In accordance with the invention, the boiler is independent of the distillation column.

In a first form of construction shown in FIG. 3, said boiler comprises a vessel 74, or boiler proper, which is intended to contain the solvent and has a substantially semi-cylindrical shape. The bottom wall 75 of the boiler is so shaped as to increase the heat-exchange surface area and may accordingly have a sawtooth profile as shown by way of example in FIG. 3. The top wall of said vessel 74 is pierced by an orifice 74' in order to establish a communication with the column 18 which advantageously has a circular cross-section. The cross-section of the orifice and that of the column have suitable dimensions for ensuring on the one hand a distillation throughput without holdup by solvent vapor and for ensuring on the other hand that the filters employed, that is to say the filters 15, 48, 49 as well as the filter cartridges 67, 68, 69, can be introduced into the boiler.

The boiler 74 is supported by a heating-fluid tank 76, especially of the water-bath type. Said tank is in turn supported by a lifting platform 77 which is subjected for example to the action of jacks, eccentrics or like elements.

The orifice 74' is surrounded by an outwardly projecting circular collar 78 on which a U-section annular seal 79 of neoprene can be engaged. Said seal is intended to be fitted within a circular L-section flange 80 which is located at the exterior and surrounds the opening of the distillation column 18.

In order to place a boiler in position, it is only necessary, after placing a vessel 74 on the tank 76, to lift the platform 77, with the result that the seal 79 together with the circular collar 78 engage within the L-section flange 80 and are applied in fluid-tight contact with this latter under the action of the lifting elements of the platform 77. Fluid-tightness is thus ensured between the interior of the boiler 74 and the distillation column 18.

Figure 4:
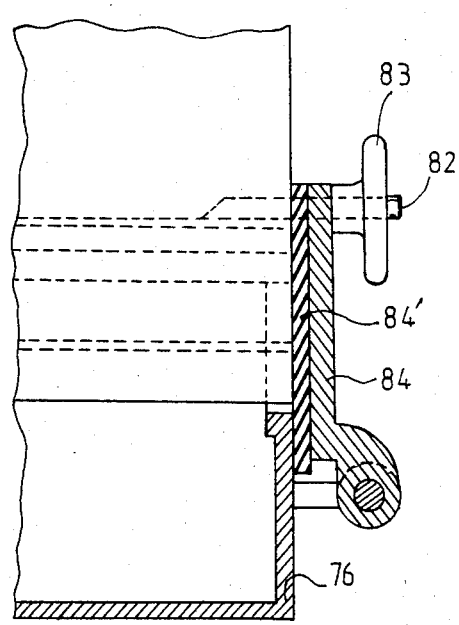
FIG. 4 is a part-sectional view in a plane at right angles to the view of FIG. 3 and showing the boiler in accordance with the invention.
Figure 5:
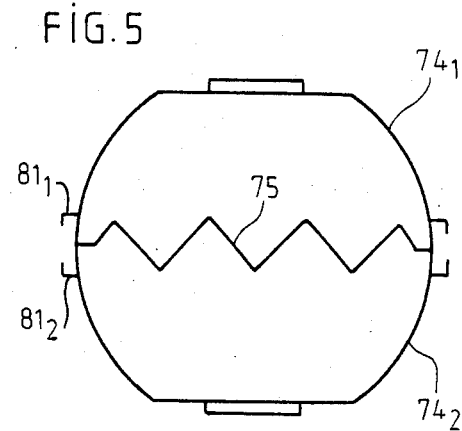
FIG. 5 is a schematic view of two interassembled boilers.

In accordance with the invention, provision is also made for longitudinal L-section members 81 which are added to the side walls of the boiler 74 near the bottom wall 75 and can be employed for several purposes: they can permit the attachment of threaded rods 82 on which are engaged nuts 83 for securing front or rear doors 84 of the water-bath tank 76 in the closed position. Plates 84' of neoprene are interposed in order to form a seal between a door and the wall of the boiler (as shown in FIG. 4). Said plates can serve as points of attachment for the lifting rings of the boiler. In a preferred embodiment of the invention, when two symmetrical boilers $74_1$, $74_2$ (as shown in FIG. 5) can be assembled together by bringing their bottom walls 75 into cooperating relation, the L-section flanges $81_1$, $8_2$ can play a useful part in providing a connection between the two boilers by any suitable coupling means fixed on each flange.

Figure 6:
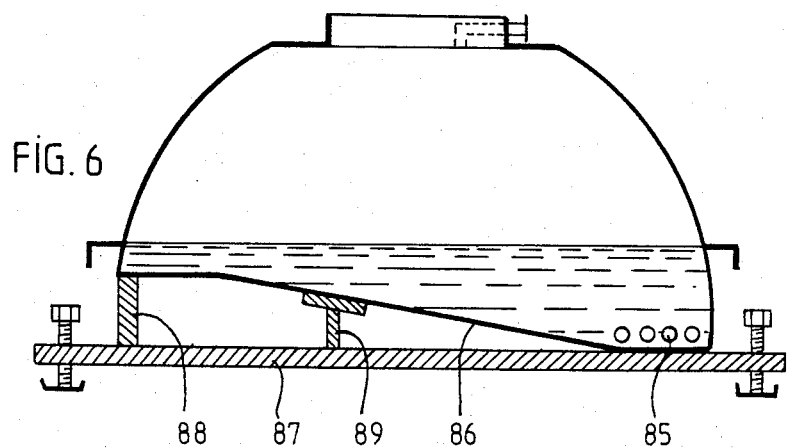
FIG. 6 is a schematic sectional view of another boiler.

There is shown in FIG. 6 another embodiment of the boiler which comprises integrated heating means such as, for example, a tube coil 85 in which any suitable heating fluid is circulated. The bottom wall of the boiler has a sloping central portion 86 in order to accommodate the tube coil in the lower portion. The boiler is supported on a liftable platform 87 by means of spacer members 88, 89.

Figure 7:
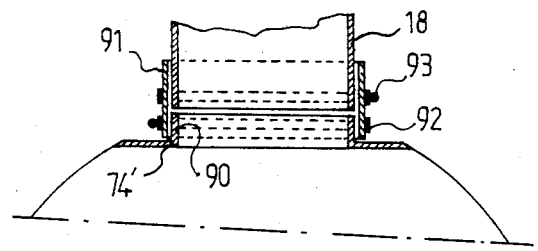
FIG. 7 is a fragmentary sectional view of another system for securing the boiler.

FIG. 7 illustrates an alternative embodiment of the system adopted for removable attachment of the boiler to the column. In this case, the orifice 74' is surrounded by an annular collar 90 having the same transverse cross-section as the distillation column 18. A sleeve 91 of neoprene can be forcibly fitted over the collar 90 and the column 18 and can provide a fluid-tight connection between these two elements by means of clamping rings 92 and 93. This form of construction makes it possible to dispense with the need to make use of a plate or platform for lifting the boiler. Thus the boiler can be lifted directly by suitable lifting means in order to be either placed in position for coupling to the column or removed.

In accordance with the invention, all the parts of the installation which constitute the solvent regeneration and recovery circuits, namely the parts shown in the left-hand portion of FIG. 1, are assembled together within a single module and may, for instance, be housed in one and the same cubicle which is intended to remain in a "contaminated" storage room. The tank 10 as well as the incoming and return sections of the different pipes 14, 26, 46, 57 and also any systems for introduction of adjuvants constitute a second module such as, for example, a closed cubicle having two openings, only one of which is located in a "clean" storage room, namely the opening which permits discharge from the wash drum. The barrier B in FIG. 1 is a schematic representation of the separation provided between the two modules or in other words between the contaminated portion and the clean portion of the installation. Radiation-measuring instruments can be mounted within the clean module portion in order to permit appreciation of the quality of decontamination obtained at the end of a cleaning operation. In the event of unsatisfactory decontamination of the clean module, the instruments mentioned above can make use of any suitable means such as electromechanical devices or the like in order to initiate automatic locking of the discharge door of the tank.

The installation operates as follows, for example in the case of a two-bath cycle. The valves 58, 16, 27, 47 and 45 being closed, soiled and contaminated clothing is loaded through the introduction opening 13 of the tank 10. After closing the door and opening the valves 58 and 59 in order to establish an air communication between the reservoir 25 and the tank 10, the valve 27 is opened during the time required for the flow of the desired quantity of solvent into the tank and the wash drum, the adjuvant metering valve 40 being opened if necessary.

After closing the valve 27 and opening the valves 58 and 59 in order to put the tank into communication with the expansion tank 61, the wash-drum motor is started-up for the desired washing operation.

At the end of the washing cycle, the drain-off valve 16 is opened in order to permit the flow of spent solvent into the boiler by rotating the wash-drum at high speed at the end of the solvent outflow stage.

There is then carried out a second filling of the wash-drum with solvent as well as a rinsing adjuvant if necessary. After immersion with agitation at a suitable speed of rotation of the drum, the spent solvent is allowed to flow out as was the case after the washing operation.

The valves 16, 27 and 58 are then closed and the drying stage is started by introduction of air. To this end, the air intake and recirculating valves 45 and 47 are opened; the fan 50 draws-in the air and the solvent vapor which escape from the articles of clothing and are discharged into the solvent recovery unit 51 after passing through the filters 48 and 49. The air which is cooled after flowing through the recovery unit 51 and the associated cooling condenser is reheated within the bank 53, then returned to the wash-drum tank. The drum is driven in rotation throughout the duration of the drying process.

At the end of the drying cycle, the valves 16, 27, 45, 47 and 58 being closed, the clothing-discharge door 12 is unlocked and the clothing then passes out into the clean room.

As soon as a suitable quantity of spent solvent has been introduced into the boiler 17, the distillation process is started-up automatically in order to regenerate the solvent and to deliver freshly-distilled water-free solvent into the reservoir 25. The contaminated wastes remain within the boiler 17.

Should the presence of contamination be observed in any solvent container such as, for example, the water separator 23, it is only necessary to open the hand-operated drain-off valve 31 in order to empty the separator right down to the boiler 17 and to distil the drain-off solvent, thus making it possible to fill the separator with freshly distilled solvent. The operation is then repeated until no further contamination can be detected within the separator. The same procedure is adopted in the event of contamination of any one of the solvent reservoirs, namely the condenser 19, the reservoir 25, the recovery unit 51, these reservoirs being emptied by opening the associated manual drain-off valve. In order to ensure correct cleaning of the wash drum, a suitable quantity of solvent is introduced into the drum which is then driven in rotation at high speed, whereupon the solvent is allowed to flow down into the boiler.

When any one of the solvent containers has been subjected to a number of cleaning and decontamination cycles and/or to a number of cleaning cycles and when the boiler is filled with contaminated wastes, the boiler is detached from the distillation column 18 by lowering the lifting platform which supports the column, and any cartridge filters 48 and 49 as well as cartridge filters 67, 68, 69 may be introduced into the boiler, the opening of which is tightly sealed-off for subsequent disposal of the boiler. A new boiler is then fitted in position by changing the seal 79.

When the installation is employed for nuclear decontamination, the bottom walls of two boilers 17 filled with contaminated wastes are advantageously joined together. The boilers are then embedded in concrete in accordance with a practice which is customary in nuclear waste disposal techniques.

The installation thus provided by the invention offers both simple and reliable operation by reason of the fact that each part of the installation can be maintained and cleaned independently and without difficulty as well as the fact that all contaminated wastes can be collected together at a single point, namely the boiler which can then be disposed of.

What is claimed is:

1. An installation for cleaning clothes and removal of oarticulate contaminants especially from clothing contaminated by radioactive particles, of the type which operates under atmospheric pressure in a dry-cleaning solvent medium, comprising a cleaning tank which is interposed on the one hand in a solvent regeneration circuit of the type consisting of a distillation unit, a condenser, a water separator, a solvent reservoir, and which is interposed on the other hand in a solvent recovery circuit of the condenser type for recovering solvent entrained by the drying air, wherein each solvent container, namely the condenser, the water separator, the solvent reservoir of the solvent regeneration circuit and the condenser of the solvent recovery circuit, is connected independently and directly with interposition of a valve to the boiler of the distillation unit for cleaning purposes.

2. An installation according to claim 1, wherein the relative arrangement of the different containers is such that circulation of the solvent takes place under the action of gravity from the condenser to the boiler and from each solvent container to said boiler.

3. An installation according to claim 1 or claim 2, wherein the recovery circuit comprises a cooler-bank recovery unit for condensation of the solvent vapors, the solvent recovery unit being connected upstream of the water separator of the solvent regeneration circuit.

4. An installation according to claim 3, wherein said installation comprises a water recovery reservoir which is placed downstream of the water separator and is directly connected to the boiler.

5. An installation according to claim 4, wherein the boilder is removably mounted on the distillation column, in order that the boiler, when filled with contaminated wastes, may be detached from the distillation column and replaced by a new boiler.

6. An installation according to claim 5, wherein the boiler comprises a tank for collecting spent solvents and contaminated wastes, said tank being independent of the heating means.

7. An installation according to claim 5, wherein said installation comprises filtration elements and wherein the boiler opening is sufficiently large to permit introduction of the various filtration elements provided in the solvent recovery or regeneration circuits after contamination of said elements.

8. An installation according to claim 7, wherein the boiler is disposable after collecting all the contaminated wastes therein.

9. An installation for cleaning clothes and removal of particulate contaminants especially from clothing contaminated by radioactive particles, of the type which operates under atmospheric pressure in a dry-cleaning solvent medium, comprising a cleaning tank which is interposed on the one hand in a solvent regeneration circuit of the type consisting of a distillation unit, a condenser, a water separator, a water recovery reservoir which is placed downstream of the water separator and is directly connected to a boiler, a solvent reservoir, and which is interposed on the other hand in a solvent recovery circuit of the condenser type for recovering the solvent entrained by the drying air, wherein said recovery circuit comprises a cooler-bank recovery unit for condensation of the solvent vapors, the solvent recovery unit being connected upstream of the water separator of the solvent regeneration circuit, wherein each solvent container, namely the condenser, the water separator, the solvent reservoir of the solvent regeneration circuit and the condenser of the solvent recovery circuit, is connected independently and directly with interposition of a valve to a disposable boiler of the distillation unit for cleaning purposes, said boiler being removably mounted on said distillation unit, wherein the relative arrangement of the different containers is such that circulation of the solvent takes places under the action of gravity from the condenser to the boiler and from each solvent container to said boiler, and wherein the boiler opening is sufficiently large to permit introduction of various filtration elements provided in the solvent recovery or regeneration circuits after contamination of said elements.

10. An installation according to claim 9, which comprises radiation-measuring means for appreciating the quality of decontamination, said means being capable of automatically initiating the locking of the cleaning tank in the event of unsatisfactory decontamination.

* * * * *